United States Patent
Ran et al.

(10) Patent No.: US 10,575,465 B2
(45) Date of Patent: Mar. 3, 2020

(54) MOWER WITH SIDE AND BOTTOM PROTECTION FOR CUTTING MECHANISM

(71) Applicant: POSITEC TECHNOLOGY (CHINA) CO., LTD., Jiangsu (CN)

(72) Inventors: Yuanzhong Ran, Suzhou (CN); Jiang Du, Suzhou (CN); Yunhong Sun, Suzhou (CN); Xiahong Zha, Suzhou (CN); Fengli Zhao, Suzhou (CN)

(73) Assignee: POSITEC TECHNOLOGY (CHINA) CO., LTD., Suzhou (CN)

(*) Notice: Subject to any disclaimer, the term of this patent is extended or adjusted under 35 U.S.C. 154(b) by 0 days.

(21) Appl. No.: 15/319,516

(22) PCT Filed: Oct. 11, 2016

(86) PCT No.: PCT/CN2016/101718
§ 371 (c)(1),
(2) Date: Dec. 16, 2016

(87) PCT Pub. No.: WO2017/063539
PCT Pub. Date: Apr. 20, 2017

(65) Prior Publication Data
US 2018/0206402 A1    Jul. 26, 2018

(30) Foreign Application Priority Data

Oct. 13, 2015  (CN) .......................... 2015 1 0657242
Nov. 20, 2015  (CN) .......................... 2015 1 0811393
(Continued)

(51) Int. Cl.
*A01D 34/81*   (2006.01)
*A01D 34/82*   (2006.01)
(Continued)

(52) U.S. Cl.
CPC ........... *A01D 34/81* (2013.01); *A01D 34/008* (2013.01); *A01D 34/63* (2013.01); *A01D 34/828* (2013.01); *A01D 34/84* (2013.01)

(58) Field of Classification Search
CPC ........ A01D 34/63; A01D 34/74; A01D 34/81; A01D 34/828; A01D 57/01; A01D 34/008; A01D 34/84
See application file for complete search history.

(56) References Cited

U.S. PATENT DOCUMENTS 990,998 A  *  5/1911  Maldino ........................ 56/255
2,485,729 A  *  10/1949  Gentry .................. A01D 34/67
                                                    56/17.2
(Continued)

FOREIGN PATENT DOCUMENTS

CN    201612030 U    10/2010
CN    201667286 U    12/2010
(Continued)

OTHER PUBLICATIONS

International Search Report and Written Opinion, International Application No. PCT/CN2016/101718, dated Jan. 16, 2017.

*Primary Examiner* — Alicia Torres
(74) *Attorney, Agent, or Firm* — Dentons US LLP

(57) ABSTRACT

An intelligent mower capable of cutting a lawn at a boundary includes a cutting mechanism, a machine body, a side part protection, and a bottom protection. The cutting mechanism is configured to execute a cutting operation, which includes cutting along the boundary as the intelligent mower automatically follows the boundary. The machine body is connected with the side part protection and the bottom protection. The side protection is located on the side of the cutting mechanism to establish a protective barrier on the side of the cutting mechanism and the bottom protection is located below the cutting mechanism to establish a protec- (Continued)

tive barrier below the cutting mechanism. Additionally, the bottom protection includes a grass inlet.

19 Claims, 10 Drawing Sheets

(30) Foreign Application Priority Data

Nov. 20, 2015 (CN) .......................... 2015 1 0811500
Nov. 20, 2015 (CN) .......................... 2015 1 0811948

(51) Int. Cl.
*A01D 34/63* (2006.01)
*A01D 34/84* (2006.01)
*A01D 34/00* (2006.01)

(56) References Cited

U.S. PATENT DOCUMENTS

| | | | |
|---|---|---|---|
| 2,557,598 A | 6/1951 | Daggett | |
| 2,585,405 A * | 2/1952 | Reiter | A01D 34/685 56/11.6 |
| 2,701,942 A * | 2/1955 | Caldwell | A01D 43/086 56/13.3 |
| 2,791,081 A * | 5/1957 | Allen | A01D 34/866 172/99 |
| 2,914,902 A * | 12/1959 | Beymer | A01D 34/828 56/320.1 |
| 2,934,882 A | 5/1960 | Kaut, Jr. | |
| 3,038,289 A * | 6/1962 | Cross | A01D 75/20 56/255 |
| 3,057,140 A * | 10/1962 | Ridenour | A01D 34/63 56/10.5 |
| 3,312,049 A | 4/1967 | Walker | |
| 3,901,004 A * | 8/1975 | Barnes | A01D 34/63 56/10.4 |
| 5,551,220 A * | 9/1996 | Suller | A01D 34/73 56/11.9 |
| 6,269,621 B1 * | 8/2001 | Fischier | A01D 34/73 56/255 |
| 6,417,641 B2 * | 7/2002 | Peless | A01D 34/008 318/580 |
| 8,275,506 B1 * | 9/2012 | Bishel | A01D 34/008 701/25 |
| 9,021,777 B2 | 5/2015 | Johnson et al. | |
| 2002/0144408 A1 | 10/2002 | Cho | |
| 2017/0367257 A1 * | 12/2017 | Cmich | A01D 34/66 |

FOREIGN PATENT DOCUMENTS

| | | |
|---|---|---|
| CN | 201667826 U | 12/2010 |
| CN | 102475012 A | 5/2012 |
| CN | 102475012 A | 5/2012 |
| CN | 103371033 A | 10/2013 |
| CN | 204191164 U | 3/2015 |
| CN | 204191164 U | 3/2015 |
| CN | 104663141 A | 6/2015 |
| CN | 205179745 U | 4/2016 |
| DE | 9401266 U1 | 5/1994 |
| DE | 202007001567 U1 | 4/2007 |
| WO | 9930551 A1 | 6/1999 |
| WO | 2015040987 A1 | 3/2015 |
| WO | WO-2016121167 A1 * | 8/2016 ............. A01D 34/64 |

* cited by examiner

MOWER WITH SIDE AND BOTTOM PROTECTION FOR CUTTING MECHANISM

TECHNICAL FIELD

The present invention relates to the field of gardening tools, and in particular, to a mower.

BACKGROUND

Along with continuous advancement of computer technologies and artificial intelligence technologies, an intelligent mower similar to an intelligent robot begins to slowly emerge in people's life. The intelligent mower can automatically mow grass and charge in the lawn of a user without user intervention. Such automatic working system needs no more energy investment for management after setting for one time, and the user is liberated from dull, time-consuming and labor-consuming household works such as cleaning and lawn maintenance.

In order to reduce the walking resistance caused by friction between a lawn surface and a machine body, there is a distance between the bottom end of the machine body of the intelligent mower and the ground, and this distance allows people's feet to extend below the machine body, approach to a cutter as a cutting element, etc. In order to ensure the safety of people, the distance between the outermost side of the cutting element and the outside wall of the machine body of the intelligent mower is set to be larger necessarily, for example, larger than 80 mm. In this way, even people's feet extend below the machine body, the feet cannot make contact with the cutting element. Due to such arrangement manner, the intelligent mower cannot cut the lawn away from the outermost side of a working region by about 80 mm always, and such part of lawn still needs manual maintenance, and the use experience of the intelligent mower is greatly reduced.

SUMMARY

In view of this, it is necessary to provide a mower meeting the cutting and safety requirements at the same time.

A mower, comprising:

a cutting mechanism, configured to execute a cutting operation;

a machine body, connected with:

a side part protection, located in the side of said cutting mechanism, to establish a protection barrier in the side of said cutting mechanism; and a bottom protection, located below said cutting mechanism, to establish a protection barrier below said cutting mechanism, wherein said bottom protection is provided with a grass inlet.

A side part protection of the above mower can prevent a human body from making contact with a cutting mechanism from the side direction of the cutting mechanism, a bottom protection can prevent the human body from making contact with the cutting mechanism from the lower direction of the cutting mechanism, the bottom protection is provided with a grass inlet, such that cutting can be carried out smoothly; due to the bottom protection, the side part protection and the cutting mechanism can be set to approach to the outer side of the mower as much as possible, thereby realizing the cutting of the edge of the lawn, and further meeting the cutting and safety requirements at the same time.

In one of the embodiments, said grass inlet is a strip-shaped slit and an angle range between the forming direction of said grass inlet and an advancing direction of said mower is 0-45 degrees.

In one of the embodiments, the width of said grass inlet in a direction vertical to an advancement direction of said mower is less than 13 mm.

In one of the embodiments, the distance between cutting elements of the cutting mechanism and the outermost side of the machine body is less than 20 mm.

In one of the embodiments, one side of said bottom protection back onto said cutting mechanism is set into an arc raised relative to said cutting mechanism.

In one of the embodiments, said cutting mechanism is eccentrically arranged below said machine body, is deviated to one side of said machine body, and the deviated direction of said side protection and said bottom protection is same as that of said cutting mechanism.

In one of the embodiments, more than or equal to two cutting mechanisms are arranged, wherein said more than or equal to two cutting mechanisms are deviated to one side of said machine body; or more than or equal to two cutting mechanisms are arranged, and the deviated said cutting mechanisms are arranged at two sides of said machine body.

In one of the embodiments, said cutting mechanism is movably connected to said machine body, and said side part protection and said bottom protection move by following said cutting mechanism.

In one of the embodiments, said cutting mechanism can extend out a profile range of said machine body.

In one of the embodiments, said machine body comprises a moving part movably arranged relative other parts of said machine body, and said cutting mechanism, said side part protection and said bottom protection are all connected to said moving part.

In one of the embodiments, said mower also comprises a driving mechanism capable of driving said moving part to move, and said moving part drives said cutting mechanism to move during moving.

In one of the embodiments, said driving mechanism drives said moving part to rotate or slide, and said moving part drives said cutting mechanism to rotate or slide when moving.

In one of the embodiments, said driving mechanism comprise a worm gear connected to said moving part, a worm matched with said worm gear and a motor driving said worm to rotate, and when said motor drives said worm to rotate, said worm gear drives said moving part to rotate around the axis of the worm gear.

In one of the embodiments, said machine body is further provided with an elastic element, said elastic element is compressed when said cutting mechanism is subjected to a pressure, and provides an elastic force for enabling the moving part to drive said cutting mechanism to return after the pressure disappears.

In one of the embodiments, said elastic element is a torsional spring or a pressure spring.

In one of the embodiments, said cutting mechanism comprise a cutting motor, mounted on said moving part; a cutterhead, connected to the shaft of said cutting motor; and cutting elements arranged on said cutterhead.

In one of the embodiments, said side part protection extends in a height direction of said machine body, said bottom protection extends in a direction vertical to said height direction, said cutting elements have a cutting region when working, and said cutting region extends in a direction vertical to said height direction.

In one of the embodiments, said mower also comprise a traveling module and a control module arranged on said machine body, wherein said traveling module drives said mower to travel and steer, said control module is electrically connected to said traveling module to control the traveling module to work, and said control module is electrically connected to said cutting mechanism to control said cutting mechanism to execute the cutting operation.

In one of the embodiments, said control module controls said mower to walk along a preset boundary line.

In one of the embodiments, the length of said bottom protection is greater than or equal to a cutting diameter of said cutting mechanism.

In one of the embodiments, said bottom protection and said side part protection are connected into a whole.

In one of the embodiments, the height of the cutting elements of said cutting mechanism on the machine body is adjustable, and said side part protection and said bottom protection are ascended and descended by following said cutting elements.

In view of the above, it is necessary to provide a mower capable of cutting the lawn at a boundary.

A mower comprises:
an enclosure;
a first cutting head, located below the enclosure and inside the outside wall of the enclosure; and
a second cutting head, extending to the outside of the outside wall from the inside of the outside wall of the enclosure.

According to the above mower, the outer side of the enclosure is provided with a mowing working head, which can cut the grass at the boundary without extra trimming, and the working efficiency is improved.

In one of the embodiments, the first working head and the second working head respectively have a first cutting region and a second cutting region during work, wherein the first cutting region and the second cutting region form a continuous cutting region together in the direction vertical to an advancing direction of the mower.

In one of the embodiments, the mower also comprises a first cutting motor and a second motor which are located below the enclosure, wherein the first cutting head is driven by the first cutting motor to work, and the second cutting head is driven by the second cutting motor to work.

In one of the embodiments, the first cutting head comprises a cutterhead connected on a shaft of the cutting motor and driven by the first cutting motor to rotate, and a plurality of cutting elements arranged along a circumferential direction of the cutterhead.

In one of the embodiments, the second cutting head comprises a first blade and a second blade which can perform relative translation reciprocation movement under the driving of a shaft of the second cutting motor.

In one of the embodiments, the outside of the outside wall of the enclosure is further provided with a shield for protecting the second cutting head.

In one of the embodiments, when the mower works, a gap between the bottom of the shield and the ground is less than or equal to 35 mm.

In one of the embodiments, the outside wall of the enclosure is provided with rollers at two sides of the second cutting head respectively, and the shield is fixed on a rolling shaft of the rollers.

In one of the embodiments, the two second cutting heads are arranged and are located on two sides of the enclosure respectively.

In one of the embodiments, the mower also comprises a control module, which is electrically connected to the first cutting head and the second cutting head to control the two to work.

In view of the above, it is necessary to provide an intelligent mower capable of cutting the lawn at a boundary.

A mower, comprises:
an enclosure;
a cutting motor, located below the enclosure;
a cutting head, driven by the cutting motor, located below the enclosure, and extending to the outside of the outside wall from the inside wall of the outside wall of the enclosure, wherein, during work, the cutting head forms a continuous cutting region extending to the outside of the outside wall from the inside wall of the outside wall of the enclosure in a direction vertical to the advancing direction of the mower.

According to the mower, during work, the cutting head forms a continuous cutting region extending to the outside of the outside wall from the inside wall of the outside wall of the enclosure in a direction vertical to the advancing direction of the mower, compared with the traditional mower that a central rotary cutterhead is arranged in the center below the enclosure, the lawn at the boundary is also cut during normal cutting without the need of extra trimming, and the working efficiency is improved.

In one of the embodiments, the cutting head can rotate in a preset angle relative to the enclosure.

In one of the embodiments, a transmission shaft for driving the cutting head to work is further arranged below the enclosure, power is transmitted between the transmission shaft and a shaft of the cutting motor through a conveyor belt, wherein the transmission shaft is movably arranged relative to the enclosure, and the transmission shaft drives the cutting head to rotate in a preset angle when moving relative to the enclosure.

In one of the embodiments, the mower also comprises a support movably mounted relative to the enclosure, and the transmission shaft is fixed on the support and the support drives the transmission shaft to move when moving relative to the enclosure.

In one of the embodiments, an elastic element is arranged between the support and the enclosure, the elastic element is compressed when the cutting head is subjected to a pressure and provides an elastic force for enabling the support to drive the cutting head to return after the pressure disappears.

In one of the embodiments, the elastic element is a torsional spring.

In one of the embodiments, the mower also comprises a driving mechanism for driving the support to rotate.

In one of the embodiments, the cutting head comprises a first blade and a second blade which can perform relative translation reciprocation movement, wherein the transmission shaft drives at least one of the first blade and the second blade to perform translation reciprocation movement by an eccentric wheel.

In one of the embodiments, the outside wall of the enclosure is further provided with a shield for protecting the cutting head.

In one of the embodiments, when the mower works, a gap between the bottom of the shield and the ground is less than or equal to 35 mm.

In one of the embodiments, the outside wall of the enclosure is provided with rollers at two sides of the cutting head respectively, and the shield is fixed on a rolling shaft of the rollers.

In view of the above, it is necessary to provide an intelligent mower capable of thorough cleaning grass nearby an obstacle, specific to the technical problem that the grass nearby the obstacle cannot thoroughly cleaned due to an influence of the body of the intelligent mower.

An intelligent mower, comprises: a body; a driving system, configured to drive the body of the intelligent mower to travel; a cutting system, configured to mow the grass. The intelligent mower also comprises a position control system, configured to change a relative position between the cutting system and the body.

Since the above intelligent mower is provided with the position control system, the cutting system rotates to avoid the obstacle. When the mower of the present invention meets the obstacle, the position control system can change a position relation between the cutting system and the body, to further change a cutting region of the cutting system, such that the grass nearby the obstacle is located in the cutting region, therefore, the intelligent mower can finish the trimming of the grass nearby the obstacle when meeting the obstacle.

In one of the embodiments, the position control system comprises: a moving part, configured to drive the cutting system to move, arranged on the bottom of the body and capable of being exposed outside one side of the body; a rotary shaft, connected between the body and a non-geometric center of the moving part, wherein the moving part can rotate around the rotary shaft.

In one of the embodiments, the position control system further comprises a rotation control device, configured to control the moving part to rotate around the rotary shaft such that an air cutting system avoids the obstacle or is reset after avoiding the obstacle.

In one of the embodiments, the rotation control device comprises an elastic part capable of resetting the air cutting system after the air cutting system avoids the obstacle, and the elastic part is connected between the moving part and the body.

In one of the embodiments, the elastic part is a pull spring.

In one of the embodiments, the elastic part is a torsional spring.

In one of the embodiments, the moving part is fixed on the rotary shaft, and the rotation control device comprises a control motor configured to control the rotary shaft to rotate.

In one of the embodiments, the rotary shaft is connected to an edge position of the moving part.

In one of the embodiments, the cutting system comprises a blade and a cutting motor, the blade is fixed on the lower surface of the moving part, and the cutting motor controls the blade to rotate.

In one of the embodiments, the driving system comprises a driving wheel mounted on the body and a driving motor for driving the driving wheel to rotate.

BRIEF DESCRIPTION OF THE DRAWINGS

Corresponding numbers of relevant elements in the drawing as follows.

| | | |
|---|---|---|
| 100, mower | 110, machine body | 112, control module |
| 114, moving part | 120, traveling module | 122, front wheel |
| 124, back wheel | 126, traveling motor | 130, cutting mechanism |
| 132, cutting motor | 134, cutterhead | 136, cutting element |
| 1362, cutting region | 140, driving mechanism | 142, worm gear |
| 144, worm | 146, motor | 150, side part protection |
| 160, bottom protection | 162, grass inlet | 170, outer shield |
| 1001, mower | 1101, enclosure | 1121, outside wall |
| 1201, traveling module | 1301, first cutting head | 1321, cutterhead |
| 1341, cutting element | 1401, first cutting motor | 1501, second cutting head |
| 1511, first blade | 1521, second blade | 1531, speed reduction gear |
| 1541, transmission shaft | 1551, support | 1601, second cutting motor |
| 1701, shield | 1801, roller | 1702, roller |
| 1002, mower | 1102, enclosure | 1122, outside wall |
| 1202, traveling module | 1302, cutting head | 1312, first blade |
| 1322, second blade | 1332, driven wheel | 1342, transmission shaft |
| 1352, support | 1402, cutting motor | 1522, driving wheel |
| 1542, conveyor belt | 1602, shield | 1003. intelligent mower |
| 1103. body | 1213. driving wheel | 1303. position control system |
| 1313. moving part | 1323. rotary shaft | 1333. rotation control device |
| 2003. obstacle | | |

DETAILED DESCRIPTION

Implementation modes of the present invention are elaborated below with reference to the accompanying drawings, to enable the objectives, advantages and features of the present invention more comprehensible. Specific details are described below to enable persons skilled in the art to fully understand the present invention. However, the present invention may be implemented in other manners besides those described herein. Persons skilled in the art can make such improvements without departing from the concept of the present invention. Therefore, the present invention is not limited by the embodiments disclosed in the following.

Figure 1:
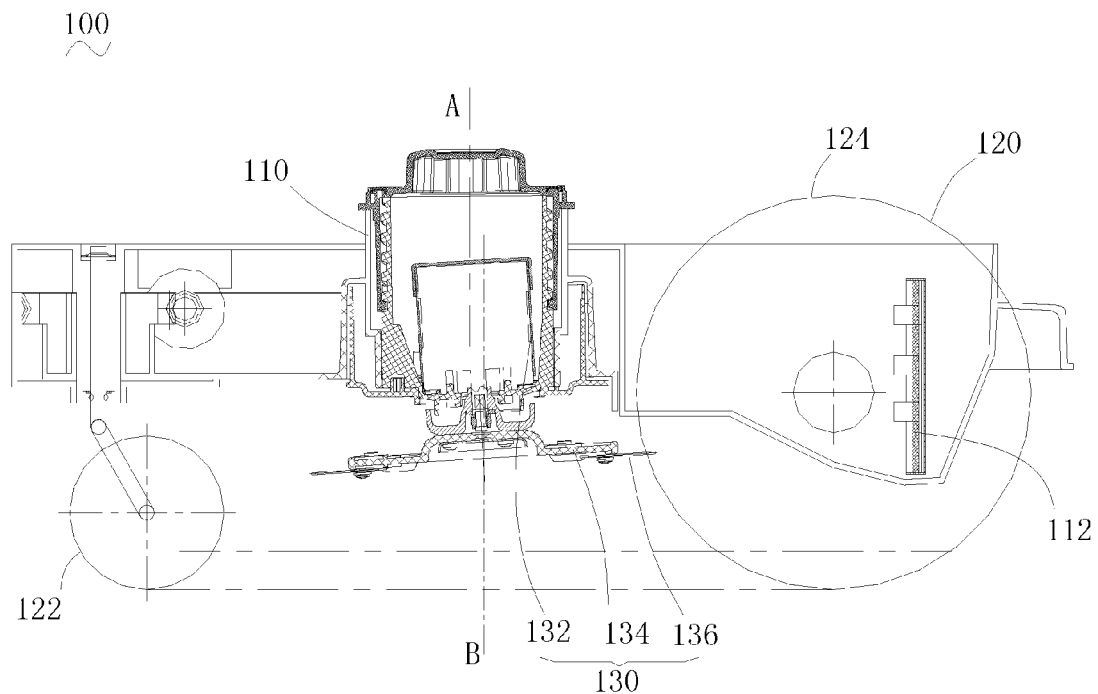
FIG. 1 is a structural schematic diagram of a mower of one embodiment.
Figure 2:
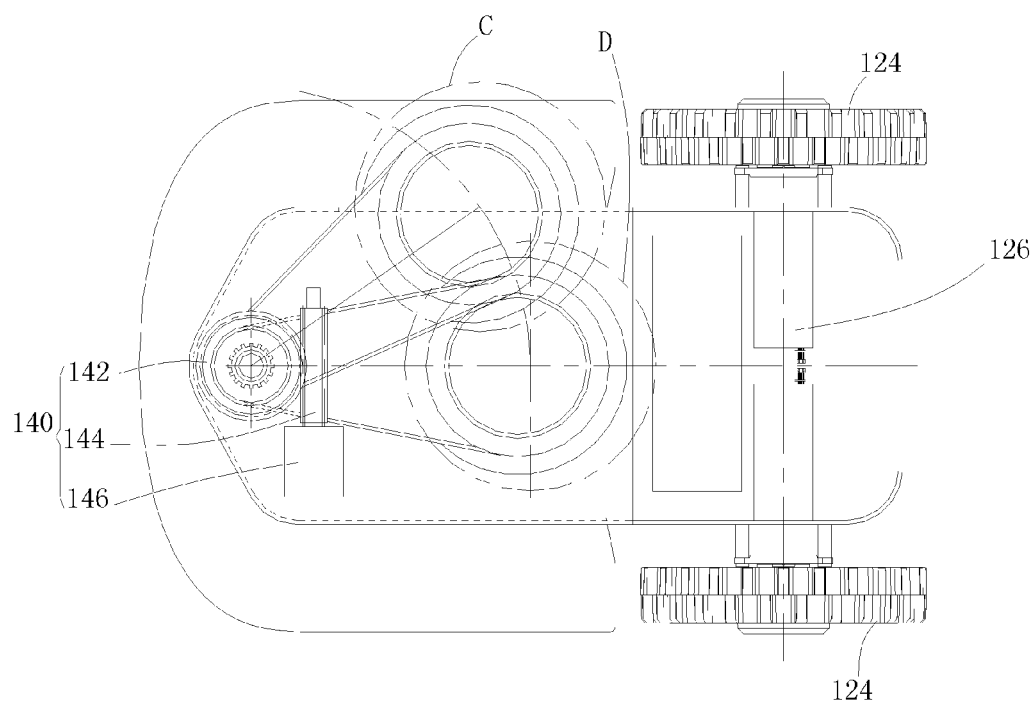
FIG. 2 is a top schematic diagram of the mower.

Referring to FIGS. 1 and 2, a mower 100 of one embodiment of the present invention comprises a machine body 110, a traveling module 120 and a cutting mechanism 130.

The traveling module 120 comprises a front wheel 122 and back wheels 124 arranged on the machine body 110, and a traveling motor 126 driving the front wheel 122 and the back wheels 124 to travel. The front wheel 122 and the back wheels 124 constitute a wheel group. One front wheel 122 is arranged and is located on the front end of the machine body 110. Two back wheels 124 are symmetrically arranged at two sides of the back end of the machine body 110. Of course, one back wheel can replace the pair of back wheels for use. Similarly, one front wheel can replace the pair of front wheels for use. As shown in FIGS. 1 and 2, the direction from right to left is an advancing direction of the mower 100. Meanwhile, the advancing direction of the mower 100 can also be a direction from the back end to the front end of the mower 100.

The mower 100 of the present invention is an intelligent mower. Referring to FIG. 1, the machine body 110 is provided with a control module 112. The control module 112 is electrically connected to the traveling module 120 and configured to control the mower 100 to travel, and is electrically connected to the cutting mechanism 130 and configured to control the cutting mechanism 130 to work. The control module 112 can control the mower to walk along a preset boundary line to execute a cutting operation.

The cutting mechanism 130 is arranged below the machine body 110 and is configured to execute the cutting operation. In the present invention, the cutting mechanism 130 executes eccentrically cut. Specifically, referring to FIG. 1, the central line A is a position where the central axis of the machine body 110 is, and the central line B is a position where the central axis of the cutting mechanism 130 is. The central line B is not coincided with the central line A and is at one side of the central line A, and is at the right side of central line A in FIG. 1, such that the cutting mechanism 130 is eccentrically arranged below the machine body 110, and is deviated to the right side of the machine body 110. In this way, the cutting mechanism 130 can approach to the outer side of the machine body 110 as much as possible, so as to cut the lawn at the boundary of a working region, i.e., edge trimming is effectively realized without manual trimming.

One cutting mechanism 130 is arranged in the present invention. However, more than or equal to two cutting mechanisms 130 can be arranged, and are both eccentrically arranged to execute the eccentric cutting. Further, all cutting mechanisms 130 are deviated to one side of the machine body 110, or the deviated cutting mechanisms 130 are arranged on both sides of the machine body 110. For example, two cutting mechanisms 130 are arranged, then the central axis of the two cutting mechanisms 130 are respectively located at the left side and right side of the central axis of the machine body 110, thereby expanding an operation range of the mower 100.

The cutting mechanism 130 is movably arranged relative to the machine body 110 to adapt to the shape of an obstacle at the boundary line of a cutting region, and realize the following moving when meeting the obstacle. Specifically, the machine body 110 is provided with a moving part 114 movably arranged relative to other parts of the machine body 110. The cutting mechanism 130 is connected to the moving part 114. The moving part 114 can drive the cutting mechanism 130 to move when moving. Or, when the position of the cutting mechanism 130 is changed due to an external force action, the position of the moving part 114 can also be changed along with the cutting mechanism 130.

In the present invention, the machine body 110 is provided with a driving mechanism 140 for driving the moving part 114 to move. The driving mechanism 140 drives the moving part 114 to move when working, and the moving part 114 drives the cutting mechanism 130 to move, for example, rotate or slide. In FIG. 2, the cutting mechanism 130 can rotate relative to the machine body 110.

Figure 6:
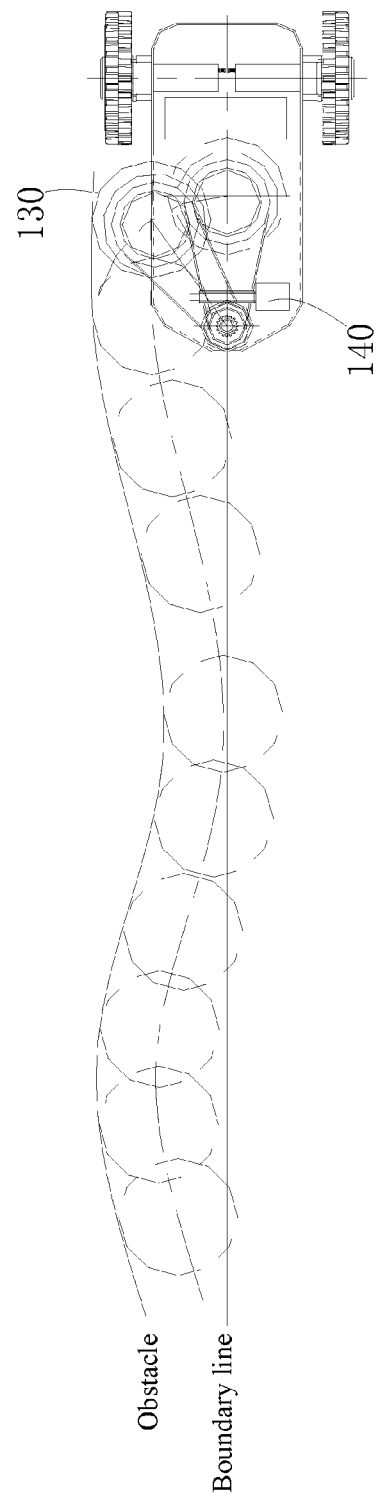
FIG. 6 is a schematic diagram that the mower adapts to the shape of a sideward obstacle for cutting.

When cutting the grass at the boundary of a complex working condition, as shown in FIG. 6, there is a wall or other obstacles at the boundary of the cutting working region, at this point, a sensing detection element arranged on the control module 112 detects the shape of the obstacle in real time, and then sends a command to the driving mechanism 140, further the driving mechanism 140 drives the moving part 114 to rotate, the moving part 114 can drive the cutting mechanism 130 to rotate left and right when rotating, so as to enable the cutting mechanism 130 to adapt to the shape of the obstacle while the mower 100 advances. The cutting mechanism 130 is set to be capable of extending out of a profile range of the machine body 110, so as to expand the cutting range of the mower 100 as required, and ensure that there is no residual grass left in the cutting of the complex working condition boundary.

In addition, the cutting mechanism 130 realizes the real-time following up according to the shape of the obstacle, and the driving mechanism may not be arranged. For example, an elastic element can be directly arranged between the cutting mechanism 130 and the machine body 110. The elastic element is compressed when the cutting mechanism 130 is subjected to a pressure, and provides an elastic force allowing the cutting mechanism 130 to return when the pressure disappears. Therefore, in a normal state, under the action of the elastic element, the cutting mechanism 130 is in a position with the maximal cutting capacity, and can cut the lawn closer to the edge. When the mower 100 advances along the obstacle, the cutting mechanism 130 moves to a direction away from the boundary if the cutting mechanism 130 is subjected to the pressure from the boundary lawn or the obstacle in the advancing process. After the pressure disappears, the elastic element actuates the cutting mechanism 130 to return. Therefore, the cutting mechanism 130 can realize the movement according to the shape of the obstacle and ensure that there is no residual grass left in the cutting of the complex working condition boundary.

The elastic element can be a torsion spring, and can allow the cutting mechanism 130 to rotate or slide. The elastic element can also be an element with elasticity such as a pressure spring, which can allow the cutting mechanism 130 to slide.

Figure 7:
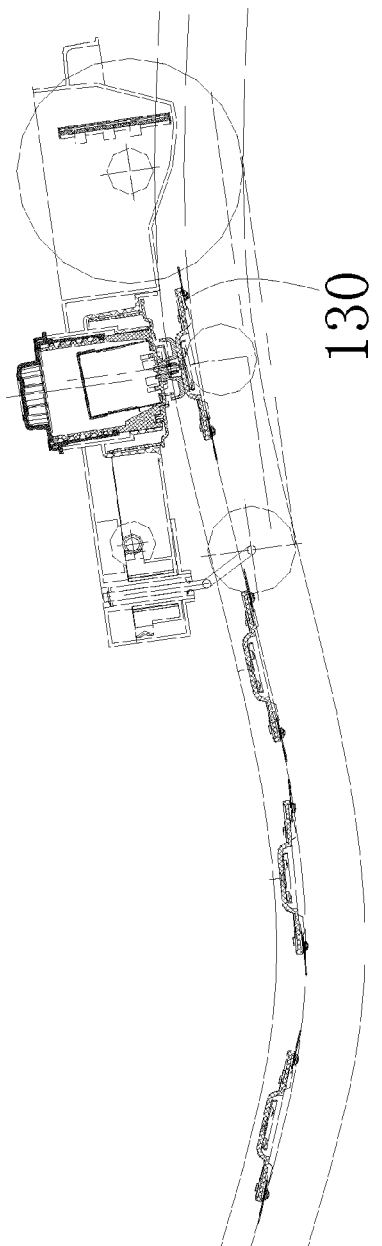
FIG. 7 is a schematic diagram that the mower adapts to the shape of the earth's surface for cutting.

Referring to FIG. 7, the cutting height of the mower 100 of the present invention can be adjusted in real time along with the fluctuation of the earth's surface, so as to adapt to different terrains. The height from the machine body 110 to the ground can be changed by adjusting a relative position between the machine body 110 and the wheel group, to further change the cutting height, or the cutting height, can be changed by changing the height of the cutting mechanism 130 on the machine body 110.

Figure 3:
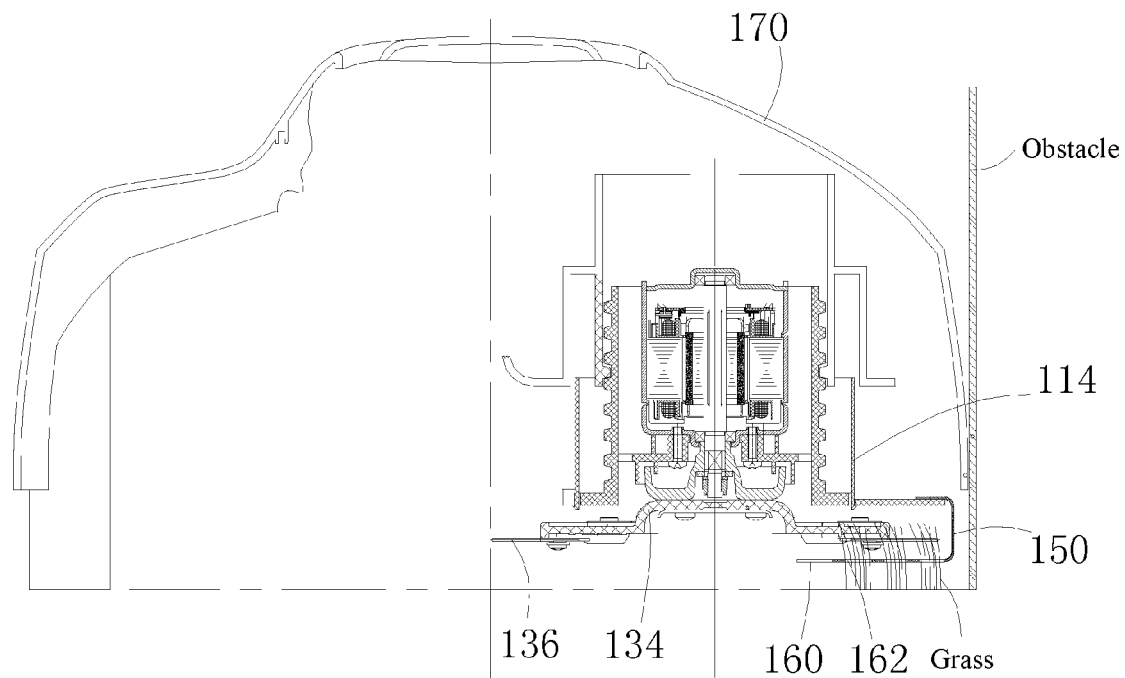
FIG. 3 is a sectional schematic diagram of the mower.

Referring to FIGS. 1 and 3, the cutting mechanism 130 comprises: a cutting motor 132, a cutterhead 134 and cutting elements 136.

The cutting motor 132 is mounted on the moving part 114. The moving part 114 can serve as a motor bracket. The moving part 114 is deviated to the right side of the machine body 110, such that the axis of a shaft of the cutting motor 132 is arranged at the right side of the central axis of the machine body 110. The cutterhead 134 is disc-like and connected to the shaft of the cutting motor 132. When the cutting motor 132 works, the cutterhead 134 is driven to rotate. A plurality of cutting elements 136 are arranged and are uniformly arranged along the circumferential direction of the cutterhead 134. The cutting elements 136 are cutting blades. When the position of the moving part 114 is changed, the moving part 114 drives the cutting motor 132, the cutterhead 134 and the cutting elements 136 to move together.

When the driving mechanism 140 is arranged to adjust the position of the cutting mechanism 130 to adapt to the cutting of different working condition boundaries, the driving mechanism 140 changes the position of the cutting mechanism 130 by driving the moving part 114. The driving mechanism 140 is mounted on the machine body 110.

In one example, referring to FIG. 2, the driving mechanism 140 comprises a worm gear 142 connected to the moving part 114, a worm 144 matched with the worm gear 142, and a motor 146 driving the worm 144 to rotate. When the motor 146 drives the worm 144 to rotate, the worm gear 142 drives the moving part 114 to rotate around the axis of the worm gear 142. FIG. 2 illustrates two positions C and D of the cutting mechanism 130.

However, the driving mechanism can be other types of transmission devices, for example, in other example, the driving mechanism 140 can be a gear and a rack mechanism.

When the elastic element is arranged to endow the cutting mechanism 130 with the capacity of adapting to the shape of the boundary obstacle, the elastic element can be arranged between other parts of the machine body 110 and the moving part 114 on the machine body 110. As abovementioned, the elastic element can be a torsional spring or common pressure spring, or other elements with elasticity.

In the present invention, the cutting mechanism 130 executes eccentric cutting, and is arranged below the machine body 110 in a deviated manner. Therefore, the cutting mechanism 130 is closer to the outside of the machine body 110.

Figure 4:
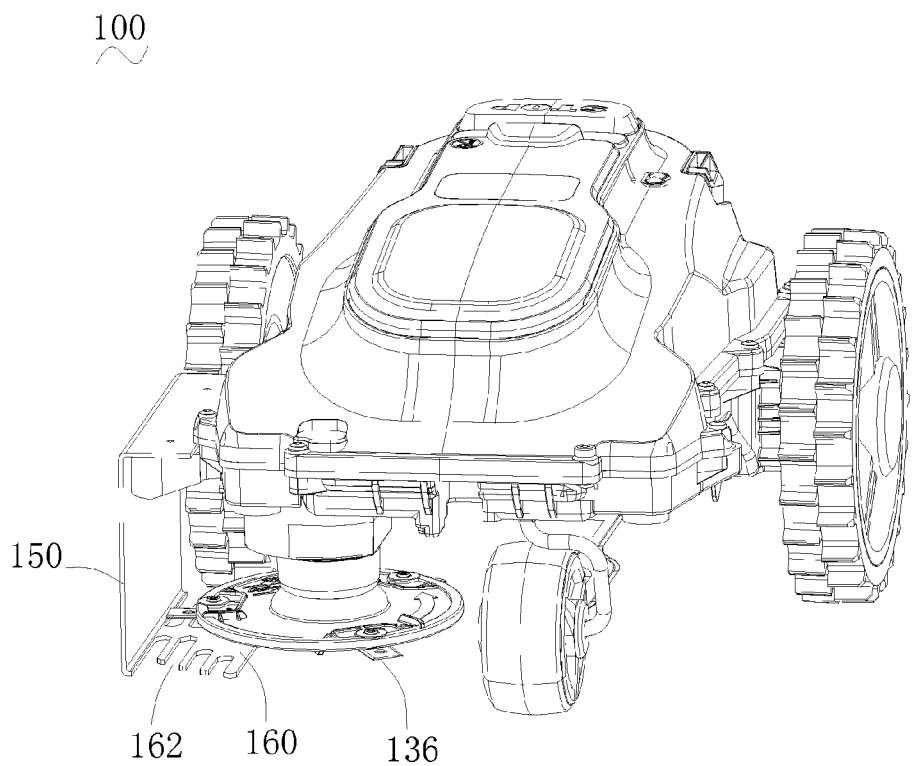
FIG. 4 is a three-dimensional schematic diagram of the mower.

For this, referring to FIGS. 3 and 4, the machine body 110 is further provided with a side part protection 150 located outside the cutting mechanism 130, so as to establish a protection barrier in the side of the cutting mechanism 130. The side part protection 150 extends in a height direction (vertical direction) of the machine body 110, to prevent a human body from making contact with the cutting elements 136 of the cutting mechanism 130 from the side direction of the mower 100, and avoid harm.

In addition, the bottom of the machine body 110 of the mower 100 is away from the ground by a certain distance, the bottom end of the machine body of the intelligent mower is away from the ground by a certain distance, and due to this distance, people's feet or hands can extend below the machine body 110 and approach to a cutter as the cutting element. The intelligent mower cruises along a preset boundary region to work in a case of unmanned operation. Although the aforesaid side part protection 150 can prevent human tissues from extending below the machine body 110 from the side direction of the mower 100 and from approaching the cutting element to some extent, the aforesaid side part protection 150 still has certain defect in the case that passers accidentally extend fingers and toes below the machine body 110 out of curiosity.

For this, the mower 100 is further provided with a bottom protection 160, to establish a protection barrier from the lower side of the cutting mechanism 130. A cutting region 1362 of the cutting elements 136 extends in the horizontal direction. The bottom protection 160 is set to extend below the cutting mechanism 130 along a direction (horizontal direction) vertical to the height direction of the machine body 110. The bottom protection 160 is located below the cutting region 1362 of the cutting elements 136, so as to establish protection between the cutting mechanism 130 and the ground, thereby thoroughly avoiding the possibility that the human body tissues are in danger after extending below the machine body 110.

The positions of the side part protection 150 and the bottom protection 160 on the machine body 110 are deviated to one side of the machine body 110, and the deviations of the two are consistent with that of the cutting mechanism 130.

Figure 5:
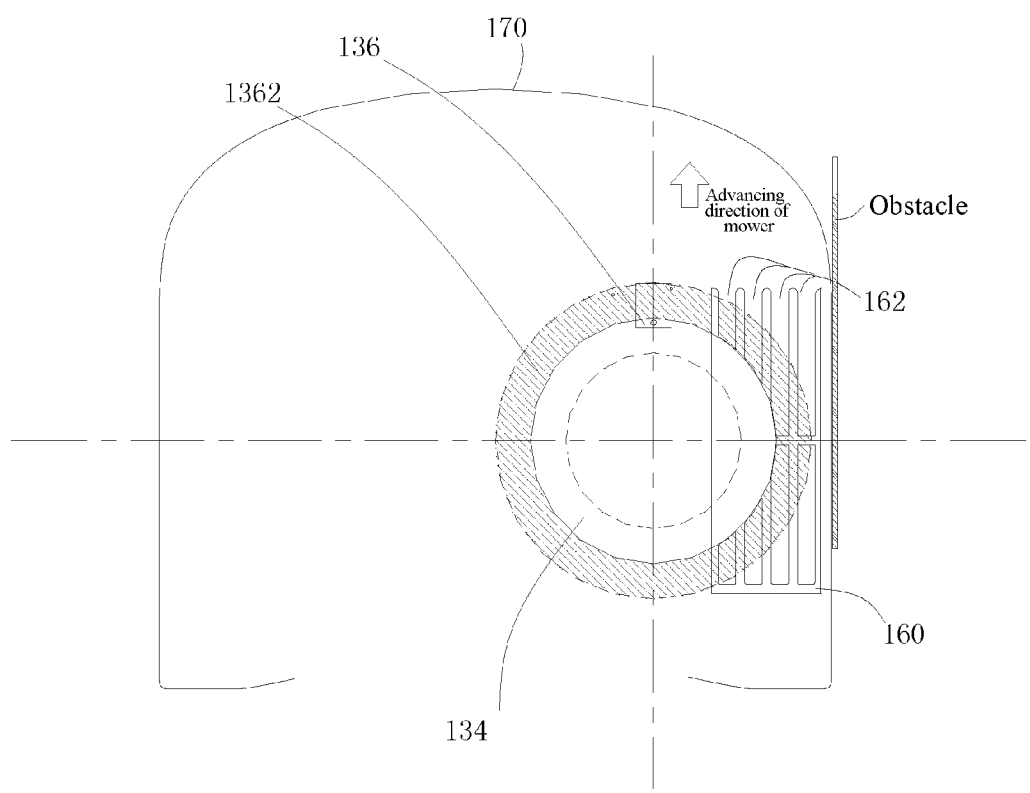
FIG. 5 is a schematic diagram of a grass inlet in a bottom protection.

Referring to FIG. 5, the bottom protection 160 is provided with a grass inlet 162. The grass inlet 162 is a strip-shaped slit, and an angle range between the forming direction of the strip-shaped slit and the advancing direction of the mower 100 is 0-45 degrees. In other words, by taking the advancing direction as an axis, the forming direction of the grass inlet 162 can be freely arranged in a range deviated leftwards and rightwards by 45 degrees. Thus in the cutting process, the bottom protection 160 presses the grass down while advancing, and the pressed grass has a tendency of restoring the original shape. Therefore, when the grass inlet 162 moves to the pressed grass, the pressed grass can enter the cutting range of the cutting element 136 just along the grass inlet 162 and is smoothly cut, and grass blocking is difficult to occur.

When the grass inlet 162 is the strip-shaped slit, the width in the direction vertical to the advancing direction of the mower 100 is less than 13 mm, to avoid the fingers contacting the cutting elements 136 through the grass inlet 162 after entering below the machine body 110. It should be noted that since the width is not the unique factor deciding whether the fingers can enter the grass inlet (there are other factors for example length), the width of the grass inlet 162 is not limited thereto. But if the width is arranged according to the above size, then the situation that the normal-sized fingers and toes of the people possibly occurring in the working region of the mower 100 enter the grass inlet 162 can be prevented without considering other factors.

The shape and forming direction of the grass inlet 162 are not limited to the above manners, for example, a certain included angle can be formed between the forming direction of the grass inlet 162 and the advancing direction. For another example, in the present invention, the grass inlet 162 is the strip-shaped slit, and the bottom protection 160 is fence-like. The grass inlet 162 can also be set into other shapes, for example, a meshed structure, or an irregular structure, etc.

One side of the bottom protection 160 back onto the cutting mechanism 130 is set into an arc raised relative to the cutting mechanism 130. In other words, one side of the bottom protection 160 opposite to the ground is arc-shaped. Thus in the advancing process of the mower 100, the bottom protection 160 is not easily inserted into the ground of the working region, and smooth cutting is ensured.

The bottom protection 160 can prevent the human body from making contact with the cutting mechanism 130 after extending below the machine body 110, and the grass inlet 162 in the bottom protection 160 can enable the cutting to be smoothly performed. While the side part protection 150 and the cutting mechanism 130 can be set to approach to the outer side of the mower 100 as much as possible. Specifically, the distance between the cutting elements 136 of the cutting mechanism and the outermost side of the machine body 110 is less than 20 mm, thereby realizing the cutting of the lawn edge while meeting the cutting and safety requirements at the same time.

The length of the bottom protection 160 is set to be greater than or equal to a cutting diameter of the cutting mechanism 130, thereby preventing the human body from making contact with the cutting elements 136 of the cutting mechanism 130 after the human body crosses over the bottom protection 160. In addition, the bottom protection 160 and the side part protection 150 are connected into a whole, therefore, on one aspect, integral molding is facilitated to reduce the assembly procedures, and on the other aspect, there is no gap between the bottom protection 160 and the side part protection 150, and the human body is prevented from entering the working region of the cutting elements 136 from the gap between the two.

The height of the cutting elements 136 of the cutting mechanism 130 on the machine body 110 is adjustable, and the side part protection 150 and the bottom protection 160 both following the cutting elements 136 to be ascended and descended. Specifically, the side part protection 150 and the bottom protection 160 are both supported by the moving part 114. Thus, the moving part drives the side part protection 150 and the bottom protection 160 to move together when moving. The side part protection 150 and the bottom protection 160 follow the cutting mechanism 130 to move together. In this way, when the cutting mechanism 130 rotates, slides, or ascends and descends relative to the machine body 110, the side part protection 150 and the bottom protection 160 can follow the cutting mechanism to move together and achieve a protection action. In addition, a relative position relation between the side part protection 150 and the bottom protection 160 and the cutting mechanism 130 and the cutting elements 136 is fixed without change and does not need to be adjusted every time.

The side part protection 150 and the bottom protection 160 can be fixed on the machine body 110, and the position is fixed without moving. The side part protection 150 and the bottom protection 160 can be movably arranged in other positions of the machine body 110 instead of moving together with the cutting mechanism 110 as long as being adjusted together with the cutting mechanism 130 every time.

In the present invention, the cutting mechanism 130 is located below the machine body 110 and located in a profile range of the machine body 110. It should be pointed out that the cutting mechanism 130 can be set into a state that all or part of the cutting mechanism 130 is located in the profile range of the machine body 110. Since the side part protection 150 and the bottom protection 160 are arranged, the human body still cannot make contact with the cutting elements 136 of the cutting mechanism 130 from the side surface and bottom, and harm is avoided.

Referring to FIG. 3, in order to achieve the purpose of safety protection, the outer part of the machine body 110 is further provided with an outer shield 170. The outer shield 170 shields above the machine body 110 and the cutting mechanism 130 to protect the machine body 110 and the cutting mechanism 130 from the upper side, and to avoid harm.

Another preferable embodiment of the mower is explained in combination with the drawings.

Figure 8:
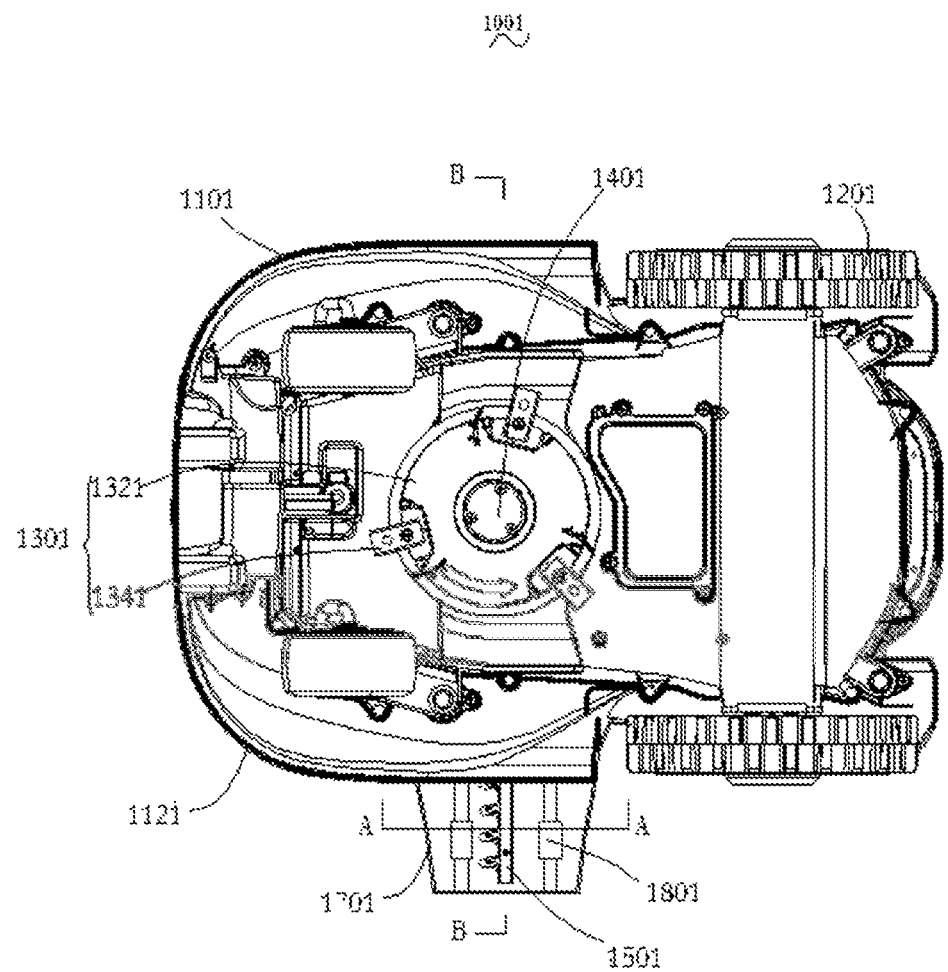
FIG. 8 is a structural schematic diagram of an intelligent mower of another embodiment.
Figure 9:
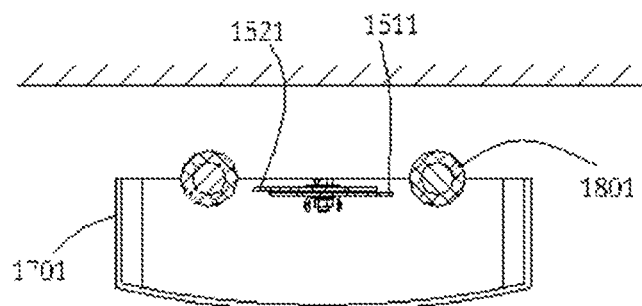
FIG. 9 is a schematic sectional diagram of A-A in FIG. 8.
Figure 10:
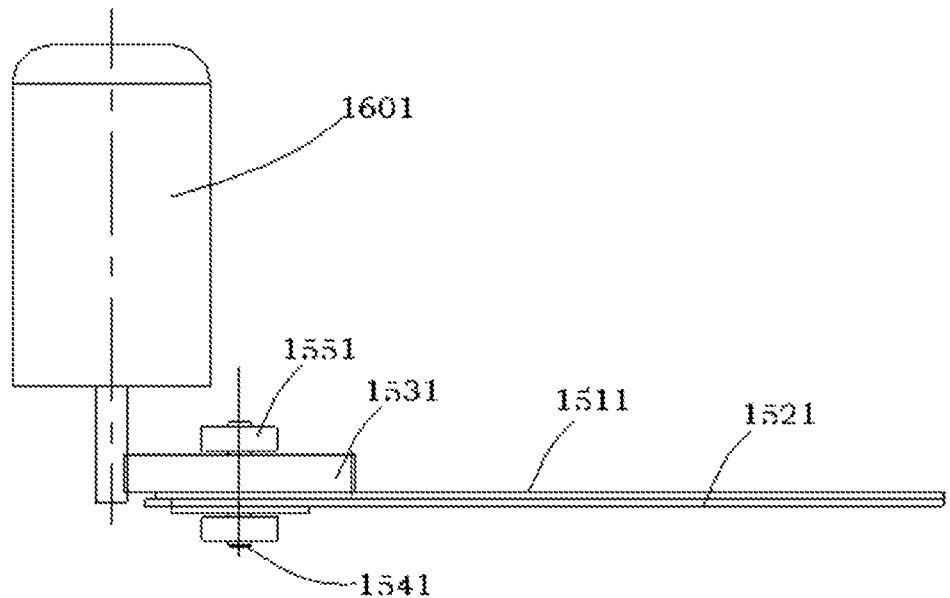
FIG. 10 is a schematic sectional diagram of B-B in FIG. 8.

Referring to FIGS. 8-10, the mower 1001 of another embodiment of the present invention, comprises an enclosure 1101, a traveling module 1201, a first cutting head 1301 arranged below the enclosure 1101, and a first cutting motor 1401 driving the first cutting head 1301 to work.

The traveling module 1201 is a wheel group mounted on the enclosure 1101, and configured to drive the mower 1001 to advance and steer. In FIG. 8, the direction from the right to left is the advancing direction of the mower 1001. Meanwhile, the advancing direction of the mower 1001 is the direction from the back end to the front end of the mower 1001.

The first cutting head 1301 is located below the enclosure 1101, and inside the outside wall 1121 of the enclosure 1101. The first cutting head 1301 is driven by the first cutting motor 1401 mounted below the enclosure 1101 to work. The first cutting head 1301 comprises a cutterhead 1321 connected to a shaft of the first cutting motor 1401 and driven by the first cutting motor 1401 to rotate, and a plurality of cutting elements 1341 arranged along the circumferential direction of the cutterhead 1321. The cutting elements 1341 are usually blades made of a metal material.

A round first cutting region is formed inside the outside wall 1121 of the enclosure 1101 when the first cutting head 1301 works. When the mower 1001 works, the first cutting head 1301 mainly cuts the grass below the enclosure 1101, and cannot cut the grass outside the enclosure 1101. The mower 1001 cuts in the working region defined by the boundary, when the intelligent mower walks to the edge of the lawn, the mower is automatically steered, such that the lawn located at the edge outside the boundary cannot be mowed by the first cutting head 1301 always.

For this, the mower 1001 of the present invention is further provided with a second cutting head 1501. A second cutting motor 1601 driving the second cutting head 1501 to work is arranged below the enclosure 1101.

The cutting elements of the second cutting head 1501 extend to the outside of the outside wall 1121 from the inside of the outside wall 1121 of the enclosure 1101. When the second cutting motor 1601 drives the second cutting head 1501, the second cutting region formed by the second cutting head 1501 extends to the outside of the outside wall 1121 of the enclosure 1101 from the inside of the outside wall 1121 of the enclosure 1101. In addition, the first cutting region and the second cutting region jointly form a continuous cutting region in the direction vertical to the advancing direction of the mower 1001.

When the mower 1001 cuts along the boundary line, the grass below the enclosure 1101 is cut using the first cutting head 1301, and the grass located outside the enclosure 1101 and located in the lawn at the edge outside the boundary line is trimmed using the second cutting head 1501. In other words, when the mower 1001 cuts along the boundary line, the grass outside the boundary line is cut together without the need to cut the grass at the edge of the lawn using another mower after the work of the mower 1001 is finished.

The second cutting region formed by the second cutting head 1501 extends to the outside of the outside wall 1121 of the enclosure 1101 from the inside of the outside wall 1121 of the enclosure 1101, and remedies the deficiency of the cutting capacity of the first cutting head 1301 to certain extent. The first cutting region and the second cutting region are continuous to form a large cutting region, thereby increasing a one-time operation range of the mower 1001 and further improving the working efficiency.

Further, two second cutting heads 1501 are arranged and are located on both side of the enclosure 1101 respectively, and the one-time operation range of the mower 1001 is expanded as much as possible.

Referring to FIG. 10, the second cutting head 1501 is a scissor pair and comprises a first blade 1511 and a second blade 1521 which can perform relative translation reciprocation movement under the driving of a shaft of the second cutting motor 1601.

The first blade 1511 and the second blade 1521 perform relative translation reciprocation movement, and power of the two comes from the shaft of the second cutting motor 1601. For example, a specific implementing manner can be as follows:

The first cutting motor 1601 is fixed on the enclosure 1101, and power is transmitted to a transmission shaft 1541 using a speed reduction gear 1531. The transmission shaft 1541 is supported on a support 1551. The first blade 1511 is fixed on the support 1551, and is a fixed blade, and keeps still in the relative translation reciprocation movement. The second blade 1521 and the transmission shaft 1541 transmit power by an eccentric transmission mechanism, such that the rotation movement of the transmission shaft 1541 is converted into the reciprocation movement of the second blade 1521.

In addition, or the first blade 1511 and the second blade 1521 are connected to the transmission shaft 1541 by an eccentric transmission mechanism, such that the rotation movement of the transmission shaft 1541 is converted into the relative reciprocation movement of the first blade 1511 and the second blade 1521. For example, the transmission shaft 1541 can be provided with an eccentric wheel, the first blade 1511 and the second blade 1521 are respectively fixed in different positions of the eccentric wheel. When the eccentric wheel rotates, the first blade 1511 and the second blade 1521 realize relative reciprocation movement.

The second cutting head 1501 is a scissor pair, and the first blade 1511 and the second blade 1521 are usually strip-shaped and occupy a small space so as to conveniently extend to the outside of the outside wall 1211 from the inside of the outside wall 1211 of the enclosure 1101, and it is also convenient to arrange the second cutting motor 1601 below the enclosure 1101.

The mower 1001 of the present invention is an intelligent mower, and further comprises a control module. The control module is electrically connected to the traveling module 1201, and configured to control the mower 1001 to travel; and is electrically connected to the first cutting head 1301 and the second cutting head 1501 and configured to control the first cutting head 1301 and the second cutting head 1501 to work.

Referring to FIG. 8, a shield 1701 for protecting the second cutting head 1501 is further arranged outside the outside wall 1121 of the enclosure 1101. The shield 1701 protects the part of the second cutting head 1501 outside the enclosure 1101 from the upper side direction, side directions, and front and back sides, and the condition that accidental injury occurs during work since the second cutting head 1501 exposed is avoided.

In addition, the shield 1701 is set into a state when the mower 1001 works, the distance between the bottom of the shield and the ground is less than or equal to 35 mm with the purpose of preventing fingers or toes from entering from the lower side of the shield 1701.

Rollers 1801 are arranged at two sides of the outside wall 1121 of the enclosure 1101 above two sides of the second cutting head 1501. The shield 1701 is fixed on a rolling shaft of the rollers 1801, and thus obtains better supporting. In addition, the rollers 1801 achieve the action of protecting the second cutting head 1501 to some extent.

The preferable embodiments of the mower are explained in combination with the drawings.

Figure 11:
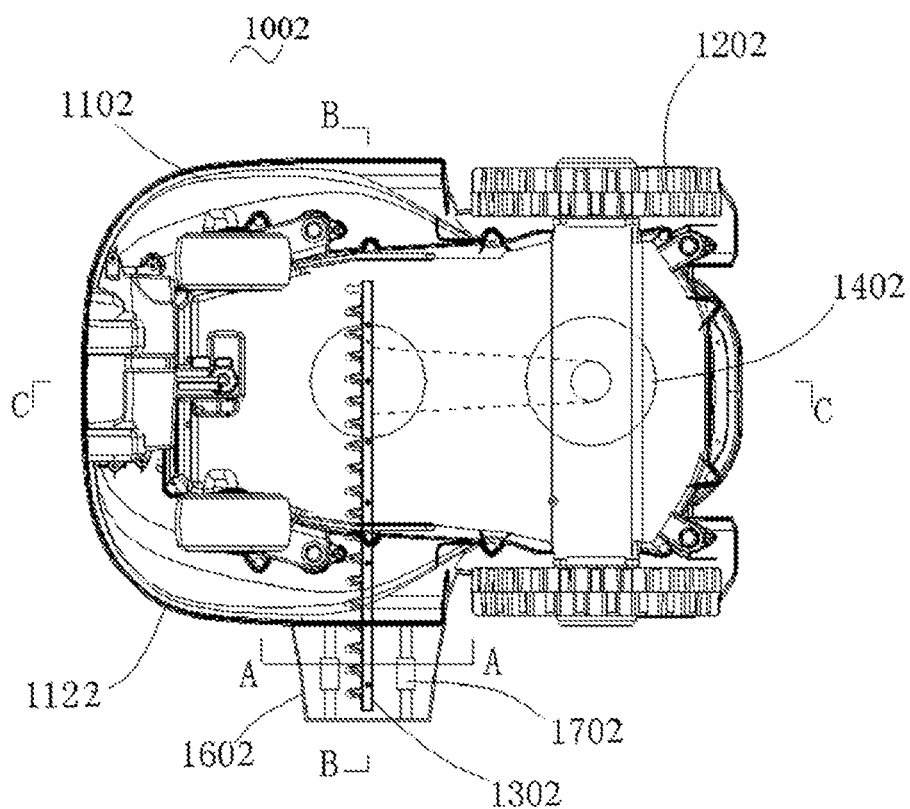
FIG. 11 is a structural schematic diagram of an intelligent mower of further embodiment.
Figure 12:
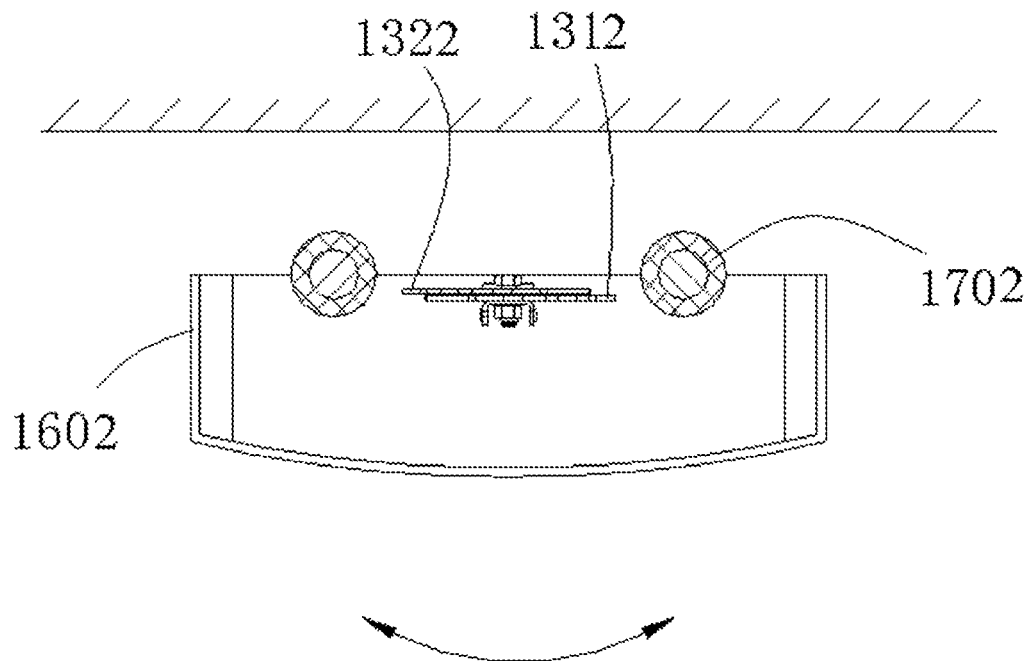
FIG. 12 is a schematic sectional diagram of A-A in FIG. 11.
Figure 13:
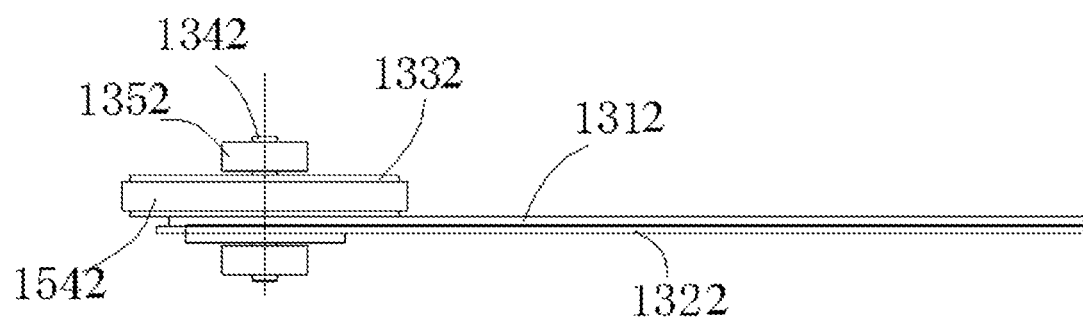
FIG. 13 is a schematic sectional diagram of B-B in FIG. 11.

Referring to FIGS. 11-13, the mower 1002 of further embodiment of the present invention comprises an enclosure 1102, a traveling module 1202, a cutting head 1302 arranged below the enclosure 1102, and a cutting motor 1402 driving the cutting head 1302 to work.

The mower of the present invention is an intelligent mower 1002, and also comprises a control module. The control module is electrically connected to the traveling module 1202 and configured to control the mower 1002 to travel; and electrically connected to the cutting head 1302 and configured to control the cutting head 1302 to work.

The traveling module 1202 is a wheel group mounted on the enclosure 1102 and configured to drive the mower 1002 to advance and steer. In FIG. 11, the direction from right to left is the advancing direction of the mower 1002. Meanwhile, the advancing direction of the mower 1002 is the direction from the back end to the front end of the mower 1002.

The cutting head 1302 extends to the outside of the outside wall 1122 from the inside of the outside wall 1122 of the enclosure 1102, and forms a continuous cutting region extending to the outside of the outside wall 1122 from the inside of the outside wall 1122 of the enclosure 1102 in the direction vertical to the advancing direction of the mower 1002.

When the mower 1002 cuts along the boundary line, the part of the cutting head 1302 located below the enclosure 1102 cuts the grass below the enclosure 1102, and the part of the cutting head 1302 located outside the outside wall 1122 of the enclosure 1102 can cut the grass located outside the enclosure 1102 and located at the lawn at the edge outside the boundary line.

Compared with the traditional mower in which a rotary cutterhead is arranged in the central position below the enclosure, when the mower 1002 cuts along the boundary line, the grass inside and outside the boundary line can be cut together, therefore on one aspect, the one-time operation range of the mower 1002 is larger, and the working efficiency is improved, and on the other aspect, another mower is not additionally used to cut the grass at the edge of the lawn after the working of the mower 1002 is finished.

Figure 14:
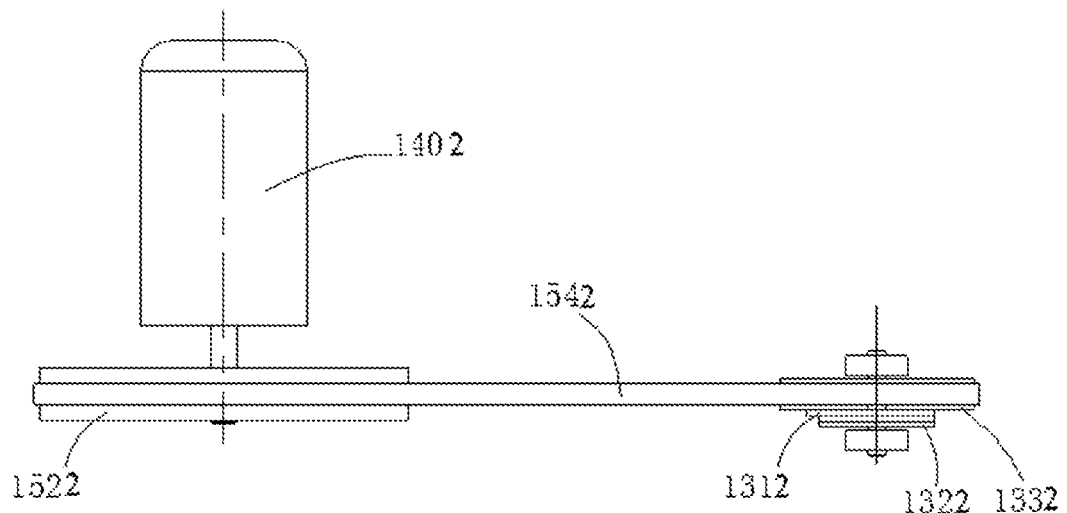
FIG. 14 is a schematic sectional diagram of C-C in FIG. 11.

Referring to FIGS. 13 and 14, the cutting head 1302 is a scissor pair, and comprises a first blade 1312 and a second blade 1322 which can perform relative translation reciprocation movement under the driving of a shaft of the cutting motor 1402.

The first blade 1312 and the second blade 1322 perform relative translation reciprocation movement, and the power of the two comes from the shaft of the cutting motor 1402. For example, a specific implementing manner is as follows:

The cutting motor 1402 is fixed on the enclosure 1102, power is transmitted to a driven wheel 1332 of the cutting head 1302 using a driving wheel 1522 and a conveyor belt 1542. The driven wheel 1332 transmits rotary power to the transmission shaft 1342. The transmission shaft 1342 is supported on a support 1352. The first blade 1312 is fixed on the support 1352, and is a fixed blade and kept still in the relative translation reciprocation movement. The second blade 1322 and the transmission shaft 1342 transmit power by an eccentric transmission mechanism, such that the rotation movement of the transmission shaft 1342 is converted into the reciprocation movement of the second blade 1322.

In addition, or the first blade 1312 and the second blade 1322 are connected to the transmission shaft 1342 by the eccentric transmission mechanism, such that the rotation movement of the transmission shaft 1342 is converted into the relative reciprocation movement of the first blade 1312 and the second blade 1322. For example, the transmission shaft 1342 can be provided with an eccentric wheel, and the first blade 1312 and the second blade 1322 are mounted in different positions of the eccentric wheel. When the eccentric wheel rotates, the first blade 1312 and the second blade 1322 can realize the relative reciprocation translation movement.

The cutting head 1302 is a scissor pair, and the first blade 1312 and the second blade 1322 are normally strip-shaped and occupy a small space so as to conveniently extend to the outside of the outside wall 1122 from the inside of the outside wall 1122 of the enclosure 1102.

The cutting head 1302 can also be set to be capable of rotating in a preset angle relative to the enclosure 1102, such that the cutting head 1302 can realize the following up in real time according to the shape of an obstacle.

In the present invention, the support 1352 is movably mounted on the enclosure 1102, when the support 1352 rotates relative to the enclosure 1102, the support 1352 drives the first blade 1312 and the second blade 1322 to move together by the transmission shaft 1342, thereby realizing the movement of the cutting head 1302.

Specifically, an elastic element can be arranged between the support 1352 and the enclosure 1102. The elastic element is compressed when the first blade 1312 and the second blade 1322 are subjected to a pressure, and provides an elastic force allowing the first blade 1312 and the second blade 1322 to return after the pressure disappears. When the mower 1002 advances, if the first blade 1312 and the second blade 1322 are subjected to the pressure from the edge lawn or the obstacle in the advancing process, the first blade 1312 and the second blade 1322 move along a direction opposite to the pressure. After the pressure disappears, the elastic element actuates the first blade 1312 and the second blade 1322 to return. Therefore, the cutting head 1302 can move according to the shape of the obstacle, as shown by an arrow in FIG. 12, the cutting head 1302 can swing back and forth and ensure that there is no residual grass in the cutting of the complex working condition boundary.

The elastic element can be a torsional spring, and can allow the cutting head 1302 to rotate or slide. The elastic element can also be an element with elasticity for example, a pressure spring, which can allow the cutting head 1302 to slide.

In addition, the cutting head 1302 realizes the following up in real time according to the shape of the obstacle, and a driving mechanism driving the support 1352 to move can also be arranged. For example, a worm gear-worm mechanism can be arranged, a worm is driven by the motor to rotate, the worm drives the worm gear to rotate around the axis of the worm gear, and the worm gear drives the support 1352 to rotate when rotating.

When the mower 1002 cuts along the boundary of the cutting region, when a wall or other obstacles exist at the boundary of the working region, a sensing detection element arranged on the control module detects the shape of the obstacle in real time, then sends a command to the driving mechanism, further the driving mechanism drives the support 1352 to rotate, and the left and right rotation of the cutting head 1302 is realized, therefore, the cutting head 1302 can adapt to the shape of the obstacle, meanwhile the mower 1002 advances.

Referring to FIG. 11, a shield 1602 for protecting the cutting head 1302 is further arranged outside the outside wall 1122 of the enclosure 1102. The shield 1601 protects the part of the cutting head 1302 outside the enclosure 1102 from the upper side direction, side directions, and front and back sides, and the condition that accidental injury occurs during work since the cutting head 1302 exposed is avoided.

In addition, the shield 1602 is set into a state when the mower 1002 works, the distance between the bottom of the shield and the ground is less than or equal to 35 mm with the purpose of preventing fingers or toes from entering from the lower side of the shield 1602.

Rollers 1702 are arranged on the outside wall 1122 of the enclosure 1102 at two sides of the cutting head 1302. The shield 1602 is fixed on a rolling shaft of the rollers 1702, and thus obtains better supporting. In addition, the rollers 1702 achieve the action of protecting the cutting head 1302 to some extent.

Figure 15:
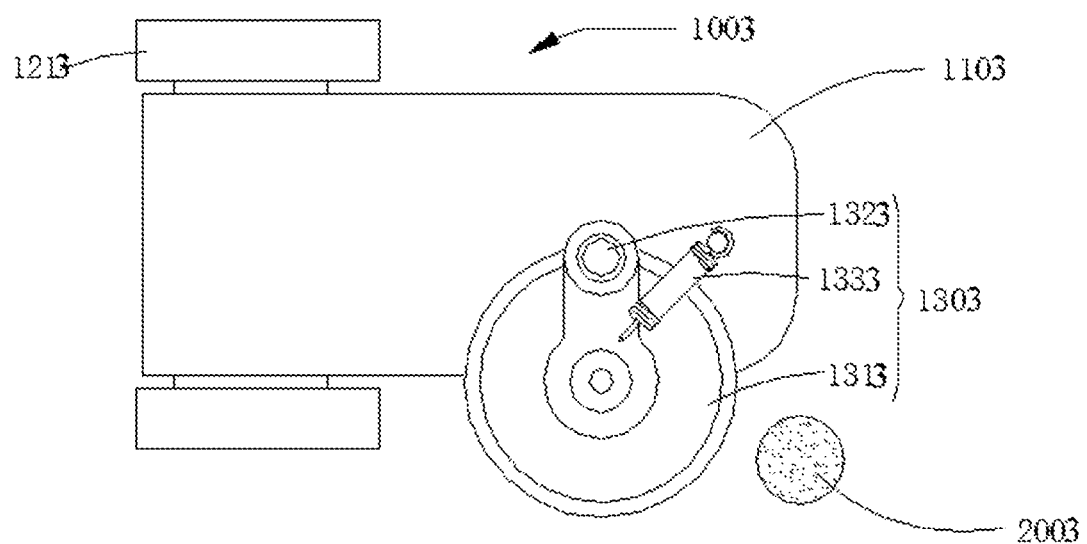
FIG. 15 is a state schematic diagram of a bottom structure of an intelligent mower according to a preferable embodiment of the present invention, at this time no obstacle encounters.

As shown in FIG. 15, the present invention discloses yet another embodiment of the intelligent mower 1003, the intelligent mower 1003 can automatically trim the grass on the lawn, and comprises a body 1103, a driving system, a cutting system and a position control system 1303, wherein the above driving system comprises a driving wheel 1213 and a driving motor (not shown), the driving wheel 1213 is arranged at the bottom of the body 1103, the driving motor drives the above driving wheel 1213 to rotate and further enables the intelligent mower 1003 to travel on the lawn.

The cutting system comprises a cutting motor (not shown) and a blade (not shown), the cutting motor drives the blade to rotate, and further uses the blade to trim the lawn. The above position control system 1303 is connected to the cutting system, and configured to change a relative position relation between the cutting system and the body 1103, when the intelligent mower 1003 trims the lawn and meets an obstacle and cannot trim the grass nearby the obstacle, the position control system 1303 controls the cutting system to avoid the obstacle and trim the grass nearby the obstacle.

Figure 16:
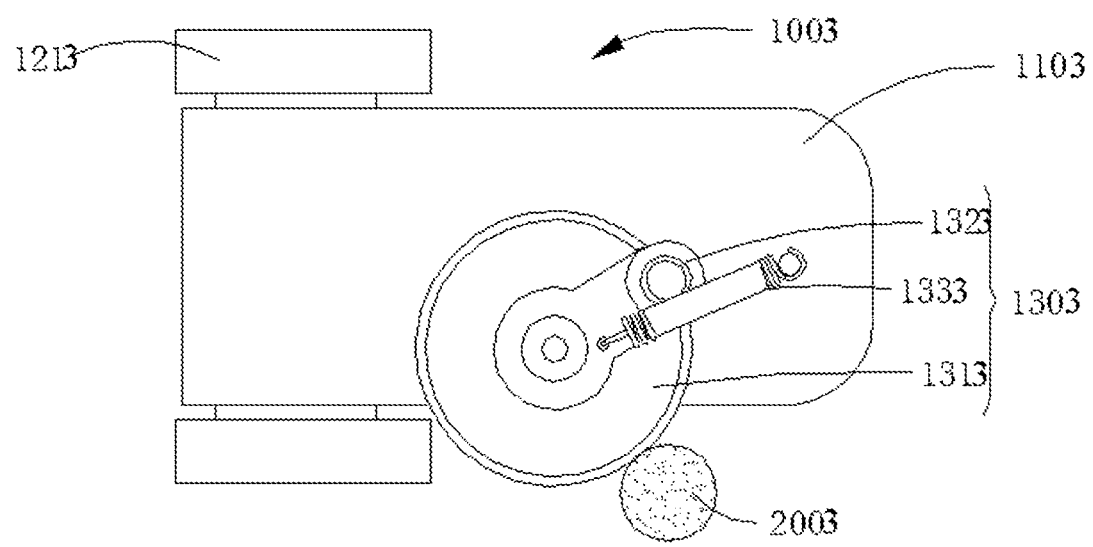
FIG. 16 is another state schematic diagram of a bottom structure of an intelligent mower according to a preferable embodiment of the present invention, at this time an obstacle encounters.

Specifically, the position control system 1303 comprises a moving part 1313 and a rotary shaft 1323. The moving part 1313 is mounted on the bottom of the body 1103 by the rotary shaft 1323, the moving part 1313 can be partially exposed outside one side of the body 1301, the blade is fixed at the lower surface of the moving part 1313, the rotary shaft 1323 is connected between the body 1103 and the moving part 1313, and the rotary shaft 1323 is connected to a non-geometric center position of the moving part 1313, when the moving part 1313 meets an obstacle 2003, as shown in FIG. 16, the moving part 1313 moves relative to the rotary shaft 1323 due to the counteraction force of the obstacle, such that the moving part 1313 drives the cutting system to travel in a manner of clinging to the edge of the obstacle 2003, and further the blade arranged at the lower surface of the moving part 1313 can trim the grass nearby the obstacle 2003.

In order to better trim the grass nearby the obstacle 2003, the rotary shaft 1323 is arranged in a position of the moving part 1313 close to the edge. In this way, the moving part 1313 can make contact with the lawn nearby the obstacle as much as possible and trims the grass in this position.

Specifically speaking, the above position control system 1303 also comprises a rotation control device 1333. When the moving part 1313 of the intelligent mower 1003 meets the obstacle, since the intelligent mower 1003 continues to advance, the moving part 1313 will certainly rotate, and when the intelligent mower 1003 continues to travel forwards to make the moving part not contact with the obstacle 2003, the rotation control device 1333 enables the moving part 1313 to return back to the initial position. For example, the rotation control device 1333 can be an elastic part, the elastic part is connected between the moving part 1313 and the body 1103, when the moving part 1313 rotates after meeting the obstacle 1303, the positions of two fixing points of the elastic part respectively fixed at the moving part 1313 and the body 1103 are changed, such that the elastic part generates certain elasticity, further, when the moving part 1313 does not make contact with the obstacle 2003, the moving part 1313 returns to the initial position due to the elasticity action of the elastic part.

The above elastic part can be a pull spring, two ends of the pull spring are fixed on the moving part 1313 and the body 1103 respectively, and when the moving part 1313 meets the obstacle 2003, the pull spring is lengthened due to the rotation of the moving part 1313, and further generates pull force. When the moving part 1313 makes no contact with the obstacle 2003, the pull spring enables the moving part 1313 to return back to the initial position using the pull force.

The elastic part can be a torsional spring or leaf spring, the difference lies in that the torsional spring or leaf spring generates corresponding torsion or bending stress due to the change of the position of the moving part 1313, and the principle is same as that of the pull spring, and is not repeated here in the present invention.

Besides the manner of the elastic part, the rotation control device 1333 can also use a control motor to control the moving part 1313 to rotate around the rotary shaft 1323, such that the cutting system and the moving part 1313 avoid the obstacle or the moving part 1313 returns back to the initial position, specifically, the control can be performed in a manner of manually inputting a control program or automatically sensing the obstacle, and the above control manner can adopt a manner well-known by those skilled in the art and is not repeated here in the present invention.

According to the intelligent mower 1003, a relative position relation between the cutting system and the body 1103 can be changed since the moving part 1313 of the position control system 1303 rotates after subjected to the resistance action of the obstacle, the blade arranged at the lower surface of the moving part 1313 trims the grass, thus the grass nearby the obstacle can be trimmed when the intelligent mower meets the obstacle, and the problem that the grass nearby the obstacle cannot be trimmed thoroughly when the traditional mower meets the obstacle is solved.

The respective technical features of the above embodiments can be combined freely, for the purpose of brief description, not all possible combinations of the above technical features are described. However, the combinations of these technical features fall within the scope recited in the present invention as long as they do not conflict with one another.

The above embodiments merely express several implementation modes of the present invention, and the description thereof is relatively specific and detailed, which cannot be thus understood as limitations to the patent scope of the present invention. It should be noted that, for those of ordinary skill in the art, several transformations and improvements can also be made without departing from the concept of the present invention, which all belong to the protection scope of the present invention. Therefore, the protection scope of the patent of the present invention should be subject to the appended claims.

What is claimed is:

1. An intelligent mower capable of cutting a lawn at a boundary comprising:
    a machine body;
    a cutting mechanism arranged below the machine body;
    a traveling module including a plurality of wheels arranged below the machine body and a motor driving at least one of the plurality of wheels; and
    a control module arranged on the machine body;
    wherein the control module is electrically connected to the traveling module to control the traveling module, and the control module is electrically connected to the cutting mechanism to control the cutting mechanism;
    wherein the cutting mechanism is eccentrically arranged below the machine body, deviated to one side of the machine body;
    wherein the control module is configured to control the mower to walk along a pre-set boundary to execute a cutting operation with the one side closer than any other side to the lawn edge, and
    wherein the machine body is connected with:
        a side part protection, located in the side of the cutting mechanism, to establish a protection barrier in the side of the cutting mechanism; and
        a bottom protection, located below the cutting mechanism, to establish a protection barrier below the cutting mechanism,
        wherein the bottom protection is provided with a grass inlet.

2. The mower of claim 1, wherein the grass inlet is a strip-shaped slit and an angle range between a forming direction of the grass inlet and an advancing direction of the mower is 0-45 degrees.

3. The mower of claim 2, wherein a horizontal width of the grass inlet of the mower is less than 13 mm.

4. The mower of claim 1, wherein the distance between cutting elements of the cutting mechanism and the outermost side of the machine body is less than 20 mm.

5. The mower of claim 1, wherein the side part protection and the bottom protection are deviated in a direction similar to the deviation of the cutting mechanism.

6. The mower of claim 5, wherein at least two cutting mechanisms are arranged, the at least two cutting mechanisms are deviated to one side of the machine body; or at least two cutting mechanisms are arranged, and the at least two cutting mechanisms are arranged at two sides of the machine body.

7. The mower of claim 1, wherein the cutting mechanism is movably connected to the machine body, and the side part protection and the bottom protection move by following the cutting mechanism.

8. The mower of claim 7, wherein the cutting mechanism extends out a profile range of the machine body.

9. The mower of claim 7, wherein the machine body comprises a moving part movably arranged relative other parts of the machine body, and the cutting mechanism, the side part protection, and the bottom protection are all connected to the moving part.

10. The mower of claim 9, wherein the mower also comprises a driving mechanism capable of driving the moving part to move, and the moving part drives the cutting mechanism to move during moving.

11. The mower of claim 10, wherein the driving mechanism drives the moving part to rotate or slide, and the moving part drives the cutting mechanism to rotate or slide when moving.

12. The mower of claim 10, wherein the driving mechanism comprises a worm gear connected to the moving part, a worm matched with the worm gear and a motor driving the worm to rotate, and when said motor drives the worm to rotate, the worm gear drives the moving part to rotate around the axis of the worm gear.

13. The mower of claim 9, wherein the machine body is further provided with an elastic element, the elastic element is compressed when the cutting mechanism is subjected to a pressure, and provides an elastic force for enabling the moving part to drive the cutting mechanism to return after the pressure disappears.

14. The mower of claim 13, wherein the elastic element is a torsional spring or a pressure spring.

15. The mower of claim 9, wherein the cutting mechanism comprises a cutting motor mounted on the moving part; a cutterhead connected to a shaft of the cutting motor; and cutting elements arranged on the cutterhead.

16. The mower of claim 15, wherein the side part protection extends in a vertical direction and the bottom protection extends in a horizontal direction the cutting elements have a cutting region when working, and the cutting region extends in a horizontal direction.

17. The mower of claim 1, wherein the length of the bottom protection is greater than or equal to a cutting diameter of the cutting mechanism.

18. The mower of claim 1, wherein the bottom protection and the side part protection are integrally formed.

19. The mower of claim 16, wherein the height of the cutting elements of the cutting mechanism on the machine body is adjustable, and the side part protection and the bottom protection are ascended and descended by following the cutting elements.

* * * * *